Patented Apr. 25, 1933

1,905,081

UNITED STATES PATENT OFFICE

HENRY B. WOODS, OF HOUSTON, TEXAS, ASSIGNOR TO HUGHES TOOL COMPANY, OF HOUSTON, TEXAS, A CORPORATION OF TEXAS

COVERED WELDING ROD

No Drawing. Application filed December 23, 1929. Serial No. 416,211.

My invention relates to welding rods for use in electric welding on tools, metal wares, utensils and the like. The invention resides particularly in the means for coating the rod so that best results in welding may be obtained.

In the use of bare rods in electric welding, it is difficult to get good results, due to the fact that there is a "blowing" of the arc at the weld, and the flame is dispersed over an unnecessarily large area. There is also the difficulty that there is no protection from the atmosphere, and welds are very often contaminated with oxides and nitrides. A strong and ductile weld, free from harmful impurities, is difficult to obtain.

This difficulty is somewhat alleviated by treating the welding rod to obtain a film of material upon the surface of the rod; as for example, the rod may be allowed to rust and the rust rolled into the surface of the rod. The voltage drop across the arc is lowered further by coating the rod with some material such as a calcium or sodium compound. The coating has the effect of reducing the cross section of the arc and the blowing effect at the arc is greatly diminished. The coating used is so thin that the slag formed when the coating melts is a thin scale that resembles the scale on a weld made with a bare rod. The coating on such rods has a thickness of less than .005 of an inch. Rods having a still greater thickness of coating, from about .010 in. to .030 in. are called covered rods. The rods are covered with a slag, or slag-forming materials, so that when a weld is made the coating and the metal rod melt off together. The light slag formed floats on the metal, giving a protecting layer that keeps the air away from the deposited metal. With covered rods the coating forms a sheath about the arc so that the arc passes from the work up through the sheath to the tip of the electrode. Thus, the arc is partially enclosed and protected from the air while a weld is being made. After the bead of weld metal has been deposited, the protecting slag is removed, leaving the surface of the weld bright and clean.

The coatings now employed on welding rods have certain objections, due to materials employed, and it is difficult to obtain a solid weld with them; and it is an object of my invention to make a covered welding rod whose covering will not only be a protection to the welded metal and produce a reducing atmosphere in and surrounding the arc, but also will contain reducing materials that will mix with the molten metal and unite with and remove any harmful oxides that may be present.

Another object of my invention is to make a covered rod whose covering will possess the properties mentioned above and to include therewith materials that will alloy with the metal of the rod and vary the composition of the welded metal.

A third object of my invention is to produce a covering which will give a slag that will be very easy to remove after a weld is made.

A further object is to make a covering for welding rods that will enable the welder to easily make welds containing no gas holes or slag inclusions.

In carrying out my invention I form a paste of a mixture of ingredients making up my improved coating. This paste is made of a light metal carbonate or calcium, magnesium or barium with silica, or a material containing silicon such as ferrosilicon. Carbon may also be added. This mixture gives a protecting slag and forms a reducing atmosphere on burning which tends to eliminate objectionable oxides. On heating, the carbonate gives off carbon dioxide, and the metal oxide remaining combines with the silica, or some of the silicon that is oxidized, to give a slag of a light metal silicate. Part of the metal in the welding electrode, for example iron, if an iron or steel electrode is used, also combines with the slag so that the slag is not entirely light metal silicate, but has varying amounts of other metals present.

To give a reducing effect to the metal itself, I add metallic manganese, ferromanganese, aluminum, ferro-aluminum, or some other reducing agent that will mix with the molten electrode and reduce any oxides that may be present. The resulting oxides of the reducing materials pass into the slag. The ferrosilicon that was mentioned above could be used for the dual purpose of removing oxides from the welded metal and producing a silicate slag.

To modify the composition of the welded metals ferromanganese, ferrosilicon, ferrotungsten, ferro-chromium, ferro-vanadium, or some other ferro alloys of metals or the metals themselves may be added. Carbon also may be used. If ferromanganese, ferrosilicon, or some other metal is used to give a reducing action, more of the alloy may be added so that there will be an excess of the added metal over that that is used in the reduction and the composition of the welded metal will be altered.

Together with the above ingredients in the covering, a binder is added. Sodium silicate is the best material to use, although carbonaceous material such as glue, etc. may be used. While the sodium silicate is used primarily as a binder, if it is used in large amounts, sufficient silica will be added to the covering so that the silica mentioned before, to give a silicate slag, may be omitted.

The proportions of the ingredients which I employ may be varied between certain limits and should be approximately as follows:
Calcium carbonate 24 to 45 parts by weight. Silica should be present in proportion of about 25 to 45 parts by weight. Sodium silicate 5 to 20 parts by weight is preferred. Ferromanganese may be employed in proportions of 5 to 25 parts. Where ferrosilicon is also used, the silicon separately added may be reduced in proportion, and I prefer to use 5 to 15 parts of ferrosilicon with silicon added not in excess of 20 parts. When ferrochromium is added, instead of ferrosilicon it should be in proportions of from 3 to 25 by weight, and the other ingredients noted should not be materially changed.

The covering may be easily applied to the rods by grinding the dry ingredients to 60 mesh, mixing with the sodium silicate and enough water to form a thin paste. The rods may then be dipped into the mixture, allowed to dry, and finally baked to remove all moisture. By variation of the speed of dipping and the thickness of the paste, the thickness of the coating can be regulated.

Welding rods covered with my coating will make uniformly solid welds. After the bead of weld material has been deposited, the slag is easy to remove. The combined reducing action of the reducing gases and the reducing alloys gives a weld free from dissolved oxides, nitrides, and gas holes. I find that the chemical analysis of the weld can be altered at will by the addition of the desired alloying elements into this coating. The coating has the advantage of being cheap and the covering can be cheaply applied. The covering can be used on almost any ferrous rods and some non-ferrous rods with a distinct improvement in strength and physical properties of the welded metal. I find that with my covered rod carbon steel can be welded to stainless steel, or stainless steel on to stainless steel, or carbon steel. Welds can be made with alloy steels of varied composition not otherwise capable of successful welding by ordinary means.

Also covered rods of this character have the advantage that the weld metal is protected against oxidation by the slag covering, and there is an annealing effect when the metal cools since the slag blanket diminishes the rate of cooling. The coating concentrates the heat of the arc, and blowing of the arc is practically eliminated. The cross section of the arc is small, concentrating the heat and giving greater penetration.

What I claim as new is:

1. A welding electrode composed of a metal core, a covering therefor containing calcium carbonate, silica, sodium silicate and ferromanganese in the following proportions by weight:

| | |
|---|---|
| Calcium carbonate | 24 to 45 parts |
| Silica | 25 to 45 parts |
| Sodium silicate | 5 to 20 parts |
| Ferromanganese | 5 to 25 parts |

2. A welding electrode comprising a metal rod, and a covering thereon comprising by weight the following:

| | |
|---|---|
| Calcium carbonate | 24 to 45 parts |
| Silica | 0 to 20 parts |
| Sodium silicate | 5 to 20 parts |
| Ferromanganese | 0 to 20 parts |
| Ferrosilicon | 5 to 15 parts |

3. A welding electrode comprising a metal rod and a covering thereon comprising by weight the following:

| | |
|---|---|
| Calcium carbonate | 25 to 45 parts |
| Silica | 25 to 45 parts |
| Sodium silicate | 5 to 20 parts |
| Ferromanganese | 5 to 25 parts |
| Ferrochromium | 3 to 25 parts |

In testimony whereof, I hereunto affix my signature, this the 18th day of December, A. D., 1929.

HENRY B. WOODS.